United States Patent Office 3,446,688
Patented May 27, 1969

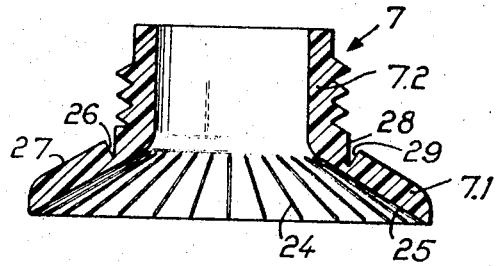
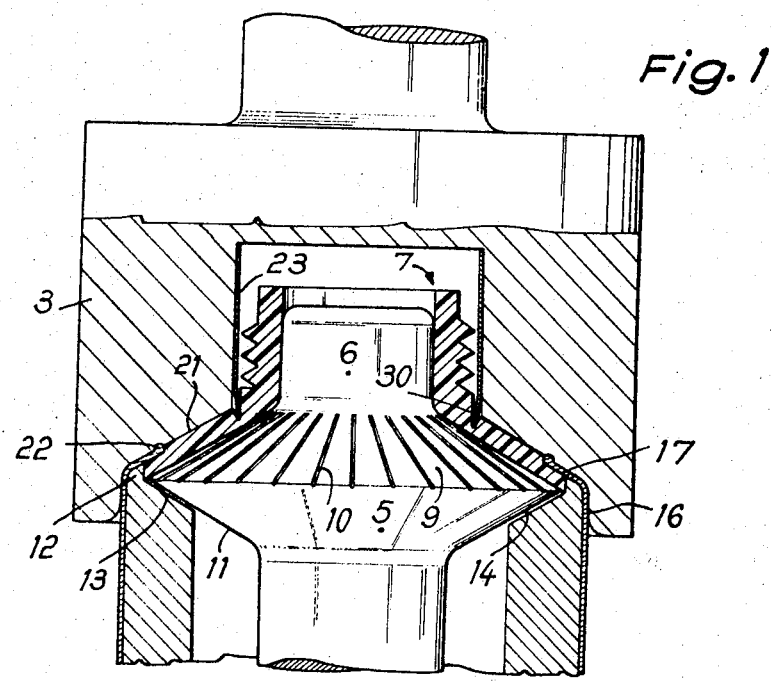
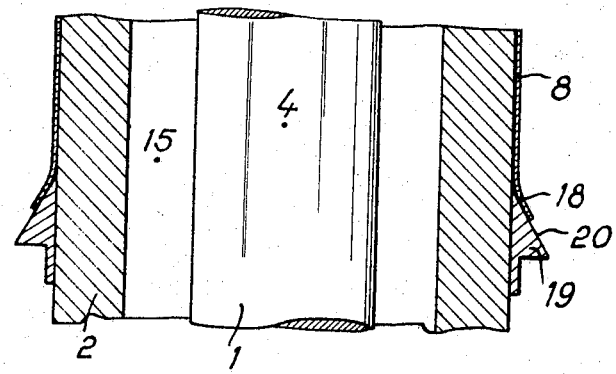

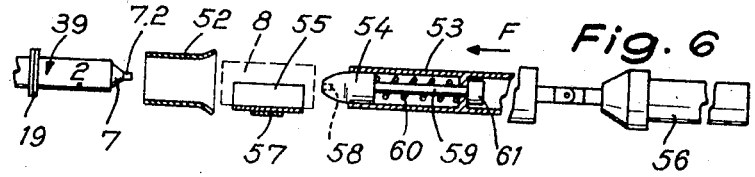
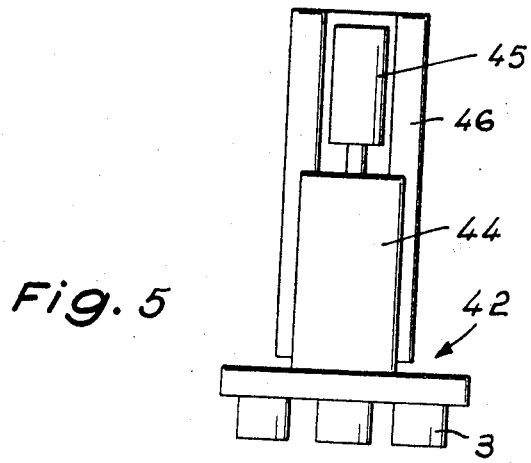
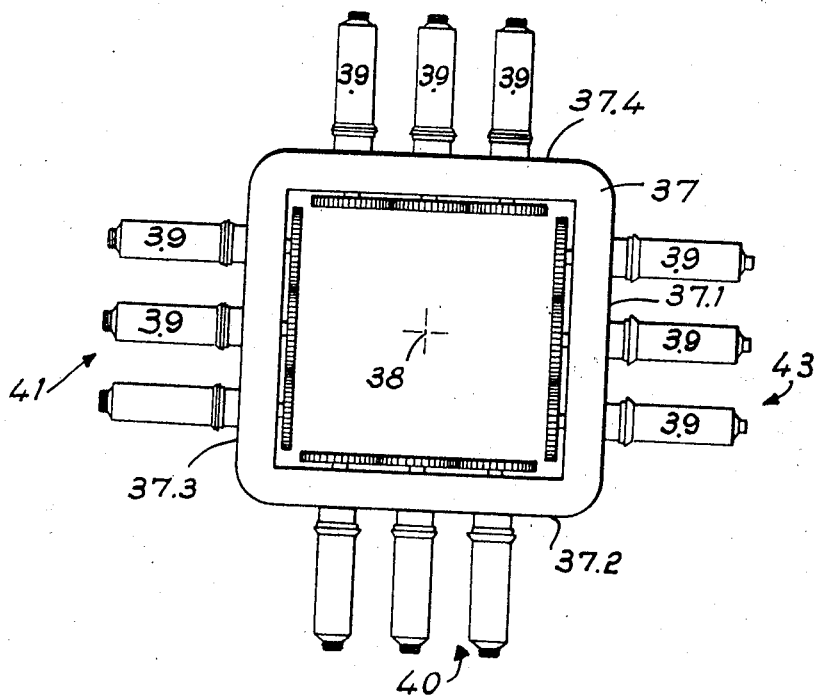

3,446,688
APPARATUS FOR SPIN WELDING A THERMO-PLASTIC ENDPIECE TO AN OPEN-ENDED THERMOPLASTIC TUBULAR BODY
Valer Flax, Vic-Fezensac, Gers, France
Filed Nov. 20, 1964, Ser. No. 412,797
Claims priority, application France, Nov. 21, 1963, 954,606; Feb. 28, 1964, 965,552; May 8, 1964, 973,691; Oct. 22, 1964, 992,235
Int. Cl. B29c 27/08
U.S. Cl. 156—423                     8 Claims

ABSTRACT OF THE DISCLOSURE

In making a packaging tube by welding a preformed endpiece to one end of a tubular body, both parts being of thermoplastic material, this disclosure teaches generating welding heat by means of friction between the contacting surfaces at the parts to be joined. The two parts are pressed axially together and, while one part is held stationary, the other is rapidly rotated about the axis of the parts. After a time sufficient for the heat to produce local fusion of the thermoplastic material, the rotation is stopped. Axial pressure between the parts is maintained until they have welded together.

CROSS REFERENCES

This patent is based upon the following French applications on which priority is claimed: 954,606, Nov. 21, 1963; 965,552, Feb. 28, 1964; 973,691, May 8, 1964; and 992,235, Oct. 22, 1964.

BACKGROUND

This invention relates to welding together of two parts of thermoplastic material, the heat required to effect welding being generated frictionally by relative rotation of the two parts while they are pressed together.

SUMMARY

The invention comprises a process for welding together two parts of the thermoplastic material, in which the two parts are pressed together and one of the two parts is held stationary while the other is rapidly rotated; rotation is continued until the frictional engagement between the parts has generated sufficient heat to produce local fusion of the thermoplastic material; and the rotation of the second part is then discontinued, while maintaining the pressure between the parts, so that the parts become welded together.

The process of the invention is particularly applicable to the manufacture of packaging tubes by welding a preformed nozzle, or other endpiece, of thermoplastic material to a preformed tubular body, also of thermoplastic material, and the invention includes a process of effecting this operation in which the endpiece is disposed in axial alignment with the body; an end portion of the wall of the body is turned inwardly to form a shoulder; the peripheral portion of the endpiece and the shoulder of the body are pressed axially together; one of the two parts is held stationary, while the other is rapidly rotated about its axis, rotation is continued until the frictional engagement between the parts has generated sufficient heat to produce local fusion of the thermoplastic material; and the rotation is then discontinued, while maintaining the axial pressure between the two parts, so that the parts become welded together.

The invention also includes apparatus for carrying out the process defined above.

DESCRIPTION OF DRAWINGS

Other features of the invention will be apparent from the appended claims, when read in the light of the following description, with reference to the accompanying drawings of some methods and apparatus which may be used when the invention is applied to the manufacture of packaging tubes. In these drawings:

FIGURE 1 is an axial part section through a set of tools for welding a tubular body to a nozzle, the drawing showing the parts after welding has been effected;

FIGURE 2 is an axial section through the nozzle alone, prior to the welding operation;

FIGURE 5 is a diagrammatic plan view of a machine for producing packaging tubes; and FIGURE 6 is a part electrical elevation of means which may be used for feeding tubular body elements to the machine of FIGURE 5.

PREFERRED EMBODIMENTS

Figure 3:
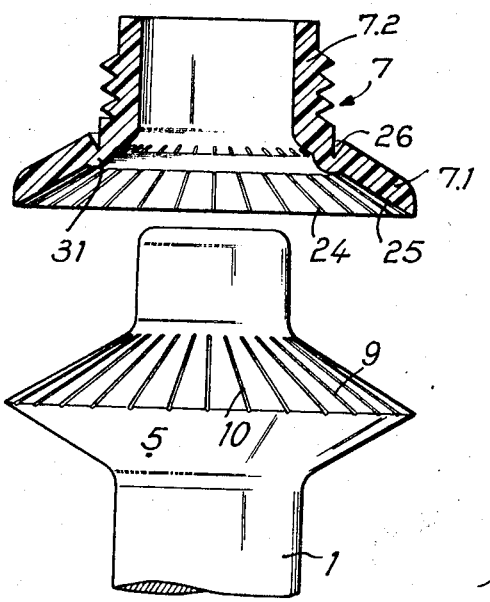
FIGURE 3 shows in section and elevation an alternative form of nozzle and one of the tools shown in FIGURE 1.

The tools shown in FIGURE 1 comprise rotary mandrel 1, tubular sleeve 2 coaxial with and surrounding the mandrel, and socket 3, which can be moved axially towards and away from the mandrel and sleeve by a pressure member (not shown). The mandrel comprises body portion 4, which can be coupled to rotary driving means (not shown), having at its end doubly frusto-conical head 5, from which there projects cylindrical boss 6. The boss serves to centre on the mandrel a preformed nozzle 7 of thermoplastic material which is to be welded to a tubular body element 8, engaged over sleeve 2 and likewise made of thermoplastic material. Head 5 of mandrel 1 has a frusto-conical bearing surface 9 on which the internal face of the nozzle 7 rests. In order to facilitate imparting a non-slip driving motion to this nozzle by the mandrel, grooves 10 are hollowed out in bearing surface 9, following its generatrices. Bearing surface 9 is joined to body 4 of the mandrel by a frusto-conical portion 11.

Fixed sleeve 2 has collar 12 which projects with respect to the periphery of driving bearing surface 9 of mandrel 1, and which surrounds nozzle 7, thus opposing centrifugal flow of material of which said nozzle is made while the welding operation is in progress. Collar 12 is rounded off towards the exterior; adjacent the collar sleeve 2 has a frusto-conical portion 13, extending parallel to but spaced from frusto-conical portion 11 of the mandrel, in order to leave a continuous passage 14 between head 5 and the sleeve through which particles of the thermoplastic material detached during the welding operation can be discharged to tubular chimney 15 between body 4 of the mandrel and sleeve 2.

Socket 3 is made of a smooth material such as that known by the name of nylon. Interior surface 16 of the socket is so shaped that when the socket is moved axially towards sleeve 2 it will turn inwardly the projecting end portion of the tubular element 8 supported on the sleeve, forming it into annular shoulder 17. The other end 18 of said tubular element 8 bears against adjustable abutment 19 fitted round sleeve 2. This adjustable abutment has frusto-conical nose 20, over which end 18 of the tubular element is expanded when shoulder 17 is being formed, thus accommodating any differences in length which there may be between the tubular elements successively operated upon. The broadening imparted to end 18 of tubular element 8 by nose 20 disappears after removal of the welded article from the tools, whereas with certain materials, such as polyethylene, the so-called "wrinkled sock" deformation which would appear on an over-long tubular element 8 if the abutment 19 were normal to the axis, would persist after removal. The internal surface of socket 3 has an annular channel 22 in which the end edge of the tubular element 8 engages, limiting the entry of that element into the socket and forming an out-turned lip at the inner margin of shoulder 17. Finally, socket 3 comprises metal ring 23, surrounding neck 7.2 of nozzle 7, which ring opposes inward flow of the material of which nozzle 7 is made while the welding operation is in progress.

In the form of nozzle illustrated in FIGURE 2, projecting ribs 24 are formed on internal face 25 of collar 7.1 of said nozzle. When the latter is being fitted on to head 5 of the mandrel, ribbed face 25 is simply brought to bear without any particular precautions against grooved bearing surface 9 of said head. Ribs 24 may be continuous or interrupted. They preferably extend along generatrices of face 25.

FIGURE 2 also shows that an annular channel 26 is hollowed out in external face 27 of the nozzle round threaded neck 7.2 of the latter. Channel 26 is relatively deep, that is to say substantially half the thickness of collar 7.1. Moreover, channel 26 may be bounded by a cylindrical surface 28 and by a frusto-conical surface 29. Cylindrical surface 28 may be equal in diameter to the external diameter of the thread on the neck and surface 29 terminates at face 27.

Socket 3 comprises a very thin metal ring 23 whereof free end 30, which projects with respect to frusto-conical portion 21 of the socket, is so shaped as to enter said channel 26 in the nozzle, and to press against the base of this channel. If this latter is of triangular section, as illustrated in FIGURE 2, metal ring 23 is chamfered at its end 30. Channel 26 may have a different section, in which case the end of ring 23 may bear against the base of this channel.

Figure 4:
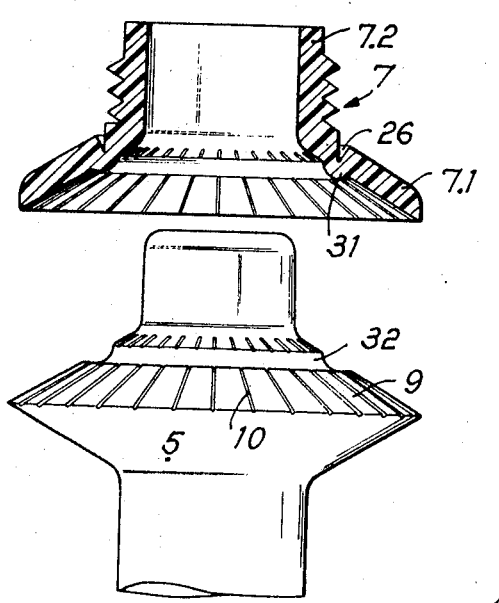
FIGURE 4 shows in section and elevation the nozzle of FIGURE 3 and an alternative form of the tool.

In the alternative form of nozzle 7, illustrated in FIGURES 3 and 4, projecting annular rib 31 is formed on internal face 25 of the nozzle collar, opposite external channel 26. The ribs 24 terminate on each side of the rib 31, but could extend across it.

The mandrel used when this second form of nozzle is employed may be identical with that shown in FIGURE 1, such as mandrel being shown in FIGURE 3. Alternatively, as shown in FIGURE 4, the head 5 of the mandrel may have, in its bearing surface 9, circular groove 32 hollowed out substantially facing rib 31 on the nozzle. Straight grooves 10 may extend on both sides of circular groove 32, or on one side only, or over the whole slope of bearing surface 9, including said groove 32.

In using the tools described above, nozzle 7 is placed in position on head 5 of mandrel 1, and tubular element 8 is threaded on to sleeve 2; the pressure member (a hydraulic jack for example) is set in motion so as to bring socket 3 closer to an assembly mandrel 1 and sleeve 2, with the result that shoulder 17 is formed on tubular element 8, and this lip is pressed against nozzle 7; mandrel 1 is then coupled to the rotating driving member so that head 5 imparts motion to nozzle 7, and sets up friction between the peripheral portion of the external surface of said nozzle and shoulder 17. When sufficient heat has been generated to cause local fusion of the thermoplastic material, rotation of the mandrel is stopped to allow welding to take place, and then the pressure member is released so that socket 3 moves away; finally, the tubular receptacle thus produced is removed from the tools. Only a very short period of rotation is required to generate the heat necessary for welding and softening of the thermoplastic material is substantially confined to the contact zone of the parts to be joined. Welding is accordingly completed very quickly once the rotation is stopped and the pressure can be released almost immediately, without the need to wait for the parts to cool. The overall time required for welding operation is thus made less than when heating is effected by high frequency electric currents, or other means for causing general heating of the parts.

In the tools illustrated, tubular body element 8 is held between sleeve 2 which is fixed and socket 3 which moves axially but does not rotate, while nozzle 7 is carried by a mandrel disposed within the sleeve which rotates but does not move axially. It will be apparent that many alternative arrangements can be adopted. Thus, for example, the socket may be fixed, the sleeve and mandrel together moving axially. Again, the rotary mandrel may be arranged within the socket, instead of within the sleeve, so that it engages the external surface of the nozzle, instead of its internal surface, the nozzle engaging against and being welded to the external surface of the inturned shoulder of the body member, instead of the internal surface of that shoulder. As a further alternative, the relative rotation between the body element and the nozzle may be produced by rotating the body element and holding the nozzle stationary.

FIGURE 5 shows machine for production in quantity of tubular packaging containers, using tools as described with reference to FIGURES 1 to 4. The machine comprises head 37 in the form of a hollow square prism, whose four faces 37.1, 37.2, 37.3, and 37.4 are symmetrically disposed around axis 38, about which the head can rotate. This head is moreover under control of a driving mechanism which may be of any current type which can rotate the head by steps of 90°, and can immobilize it accurately between the partial rotations. Thus a mechanism of the Maltese Cross type associated with an indexing device is preferably suitable.

Each of the faces 37.1 to 37.4 of head 37 supports a plurality of assemblies 39 each comprising a fixed sleeve 2 and a rotary mandrel 1. The number and distribution of the assemblies on one face are identical with those of the assemblies on the other faces. In the example illustrated, each face of head 37 supports three assemblies 39 whereof the axes are parallel to one another and situated in the same plane.

If head 37 is assumed to be in the immobilized position, faces 37.1 to 37.4 of this head are situated facing four stations 40 to 43 which are respectively assigned to the following operations:

Station 40 for manually or automatically placing nozzles 7 in position on mandrels 1 of facing assemblies 39.

Station 41 for manually or automatically placing tubular elements 8 in position on sleeves 2 of facing assemblies 39.

Station 42 for welding together nozzles 7 and tubular elements 8 placed in position on the preceding stations.

Station 43 for ejecting the receptacles thus formed.

The intermittent motion of head 37 naturally has the purpose of bringing each of the faces of said head successively into position facing the aforementioned stations.

In addition to the head 37 and its assemblies 39, the machine comprises slider 44 under control of pressure member 45 such as a pneumatic jack. Slider 44 is guided in slide-ways 46, and carries at its end a plurality of sockets 3 whereof the number and distribution are identical with those of the assemblies 39 on one face of head 37. In the example illustrated, the slider 44 therefore carries three sockets 3 whereof the axes are parallel to one another and situated in the same plane. Sockets 3 could be carried by a platen fitted directly to the end of the rod of jack 45 provided that this rod were sufficiently accurately guided. In any case, the combination defined above is disposed at finishing station 42, sockets 3 being situated in axial alignment with the assemblies 39 on the adjacent face of head 37.

Pressure member 45 is brought into use while head 37 is stopped, and intermittent rotary motion is imparted to the latter only when pressure member 45 is in the inoperative position in which sockets 3 are remote from assemblies 39.

While head 37 is stopped, pressure member 45 is set in action, and consequently brings sockets 3 heavily to bear against nozzles 7 and the ends of tubular elements 8 carried by assemblies 39 on the facing face. At the same time, rotary motion is imparted for a definite time to rotary mandrels 1 in these assemblies. Any driving device enabling synchronous motion to be imparted to them is suitable for this purpose. However, it may be advantageous for the driving device chosen to be capable of imparting motion only to the mandrels situated in the welding station 42, and not to the other mandrels, so as not to hinder the carrying out at stations 40, 41 and 43 of corresponding operations: placing caps in position, placing tubular elements in position, extracting receptacles.

If an automatic device is provided at station 41 for placing tubular elements 8 on the three assemblies 39 of the adjacent face of the head 37, this device may be of the character illustrated in FIGURE 6.

It then comprises the following, facing and aligned with each of the said assemblies 39:

Flared tubular jacket 52 slightly spaced away from corresponding assembly 39, in order to enable head 37 to rotate intermittently.

Tubular plunger 53, guided for axial movement and attached to an actuating member.

Retractable pointed finger 54 centred in plunger 53.

Some semi-cylindrical half-shells 55, open at the top and intended to receive tubular body members 8, these half-shells being situated in the free space between the set of three jackets 52 and the set of three plungers 53.

The three plungers 53 are controlled by pneumatic jack 56, which is actuated when both head 37 and an intermittent-motion conveyor 57 (of the chain type, for example) supporting half-shells 55 are stationary.

The distance between jackets 52 and fingers 54 (when plungers 53 are in the inoperative position) is at least equal to the length of one tubular element 8.

Each pointed finger 54 is truncated, and has in its truncated end a seating 58 for neck 7.2 of nozzle 7. This finger 54 is fast with rod 59 guided in the corresponding plunger 53, and spring 60 which bears against the latter tends to make said finger project to the extent permitted by stroke-limiting abutment 61. The automatic feed device operates in the following manner:

In the course of an engagement stroke (arrow F) initiated while head 37 and conveyor 57 are immobilized, three fingers 54 enter tubular elements 8 carried by three of the half-shells 55, rounding out those members. The plungers then impart motion to members 8 and thread them on to sleeves 2 of the three facing assemblies 39. The three fingers 54 abut against caps 7 previously placed in position on the aforementioned assemblies 39, and retract, compressing springs 59, while the tubular elements continue to thread on until they are brought to bear against adjustable abutments 19 of the assemblies. On the return stroke (in the opposite direction to arrow F), fingers 54 return to their initial position under the action of springs 59, but they cannot thereupon impart motion to tubular members 8, which would release them since there is no longer any contact between fingers 54 and members 8. At the end of the return stroke of plungers 53, the passages are once again free in order on the one hand to allow head 37 to rotate by a quarter of a revolution, and on the other hand to enable three half-shells 55 to be moved along by conveyor 57. Thus three new members 8 are offered up in front of three new assemblies 39. The same cycle can start again.

Automatic ejection of the formed receptacles, may be effected by providing at station 43 a distribution system for directing compressed air through assemblies 39 on the face of head 37 situated facing this station.

If nozzles 7 of the receptacles have open bores, as illustrated, the mere injection of compressed air is not sufficiently effective, and ejection is poor or does not occur at all. In order to overcome this disadvantage, a rocking plate of inverted-T form is pivotally supported at its upper end, the cross arm of this plate extending horizontally in front of and very close to the necks 7.2 of the nozzles 7 of the receptacles to be ejected. When the compressed air is injected into assembly 39 in the ejecting position, gas flow through the neck 7.2 to atmosphere is heavily retarded by the horizontal limb of the rocking plate, and thus the major part of the pneumatic energy may be used to push back the receptacles which, as they emerge, strike the said horizontal limb and cause the plate to pivot. The receptacles drop and the rocking plate returns to its initial position against an abutment (in order not to hinder rotation of the head 37).

The invention is not limited to the forms of embodiment illustrated and described in detail, since various modifications may be made thereto without departing from its scope, as defined by the appended claims.

I claim:

1. An apparatus for welding a preformed endpiece of thermoplastic material to an open-ended tubular body which is also of thermoplastic material to form a packaging tube, the endpiece having an outer surface which includes a peripheral portion, the apparatus comprising
   a sleeve over which the body tube can be engaged,
   an abutment on the sleeve to engage one end of the body tube and hold the tube with its other end portion projecting beyond the end of the sleeve,
   a rotary mandrel disposed coaxially within the sleeve and having an end surface projecting beyond the end of the sleeve to support the endpiece within the projecting end portion of the body tube and to make driving engagement with the endpiece,
   a socket coaxial with and moveable axially relative to the sleeve and the mandrel,
   the socket so shaped that upon approaching movement of the socket to the sleeve the projecting end portion of the body tube enters the socket and is thereby turned inwardly and pressed axially against the peripheral portion of the outer surface of the endpiece,
   means for rotating the mandrel about its axis to rotate the endpiece relative to the body tube.

2. The apparatus of claim 1 with the abutment on the sleeve being of frusto-conical form so that the end of the body tube can be expanded over it by axially applied pressure.

3. The apparatus of claim 2 and the socket formed internally with an annular channel adapted to receive the edge of the inwardly turned end portion of the body tube thereby limiting entry of the body tube into the socket.

4. The apparatus of claim 3 and the end surface of the mandrel provided with radial grooves to ensure non-slip driving engagement with the endpiece.

5. The apparatus of claim 4 and
   the sleeve provided at its end with a collar projecting beyond the end surface of the mandrel, the collar arranged to closely surround the periphery of the endpiece to check outward flow of molten thermoplastic material.

6. The apparatus of claim 5 with the end surface of the mandrel provided with an annular mandrel groove, for engaging a corresponding annular rib on the inner surface of the endpiece.

7. The apparatus of claim 6 in which a plurality of similar sleeve and mandrel assembiles are mounted on an intermittently rotatable head arranged to bring them successively into cooperating relationship with the same socket.

8. The apparatus of claim 7 with means for placing body tubes in position on the sleeves.

References Cited

UNITED STATES PATENTS

| | | | |
|---|---|---|---|
| 3,078,912 | 2/1963 | Hitzelberger | 156—73 XR |
| 3,245,858 | 4/1966 | Negoro | 156—73 XR |
| 2,633,894 | 4/1953 | Carwile | 156—73 |
| 3,058,513 | 10/1962 | Schaub et al. | 156—73 XR |
| 3,316,135 | 4/1967 | Brown et al. | 156—73 XR |
| 3,172,933 | 3/1965 | Flax | 156—69 XR |

FOREIGN PATENTS 26,777   9/1962   Japan.

PHILIP DIER, *Primary Examiner.*

U.S. Cl. X.R.

156—69, 73, 293, 306, 580; 264—68